Nov. 6, 1923.　　　　　　　D. E. HALL　　　　　　1,472,976
TRAFFIC SIGNALING DEVICE
Filed Aug. 11, 1922　　　4 Sheets-Sheet 3
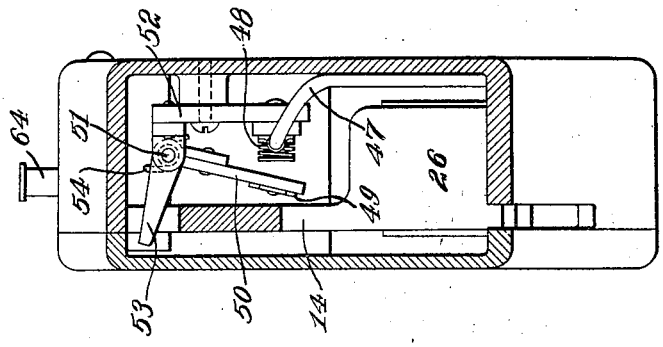
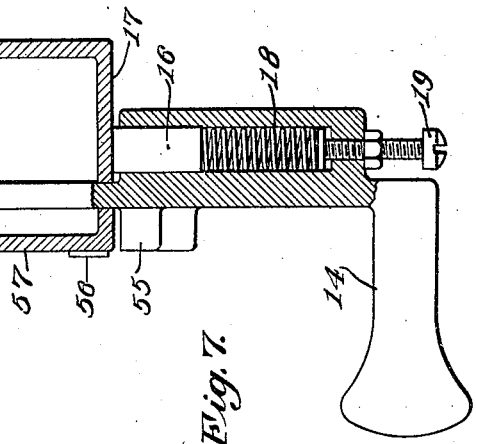
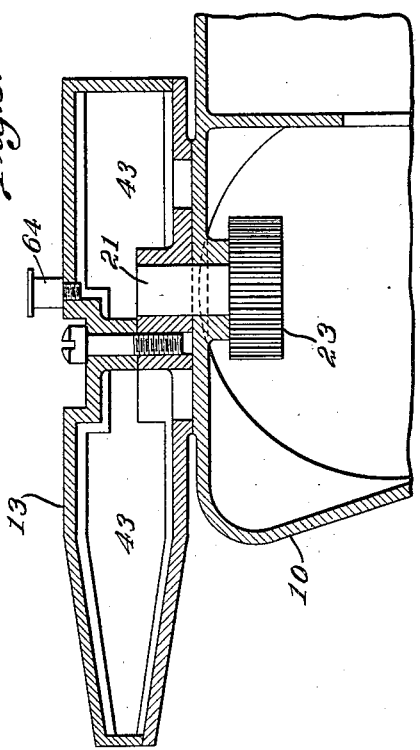
Inventor
Daniel E. Hall.
By Mason Fenwick & Lawrence,
Attorneys.

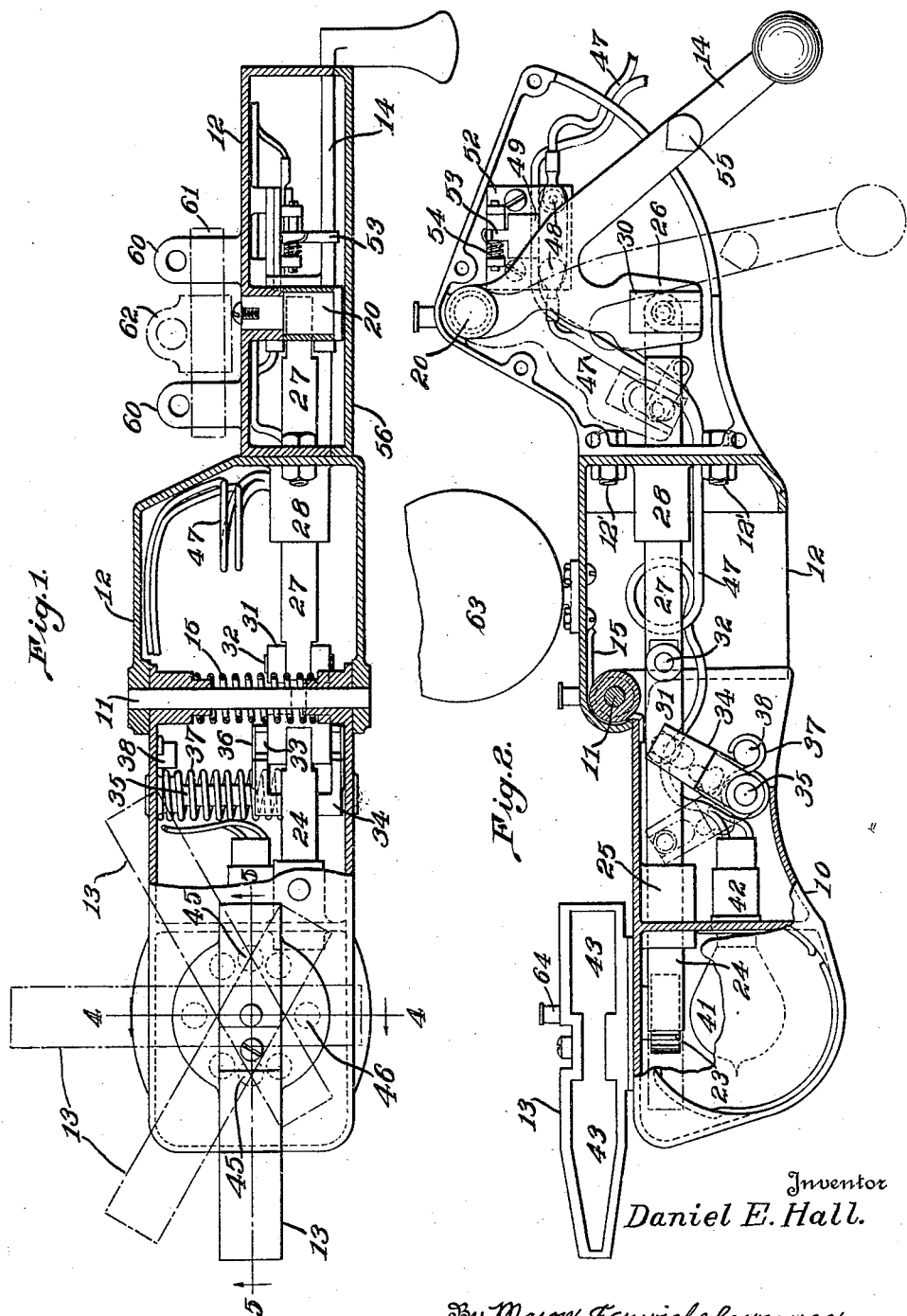

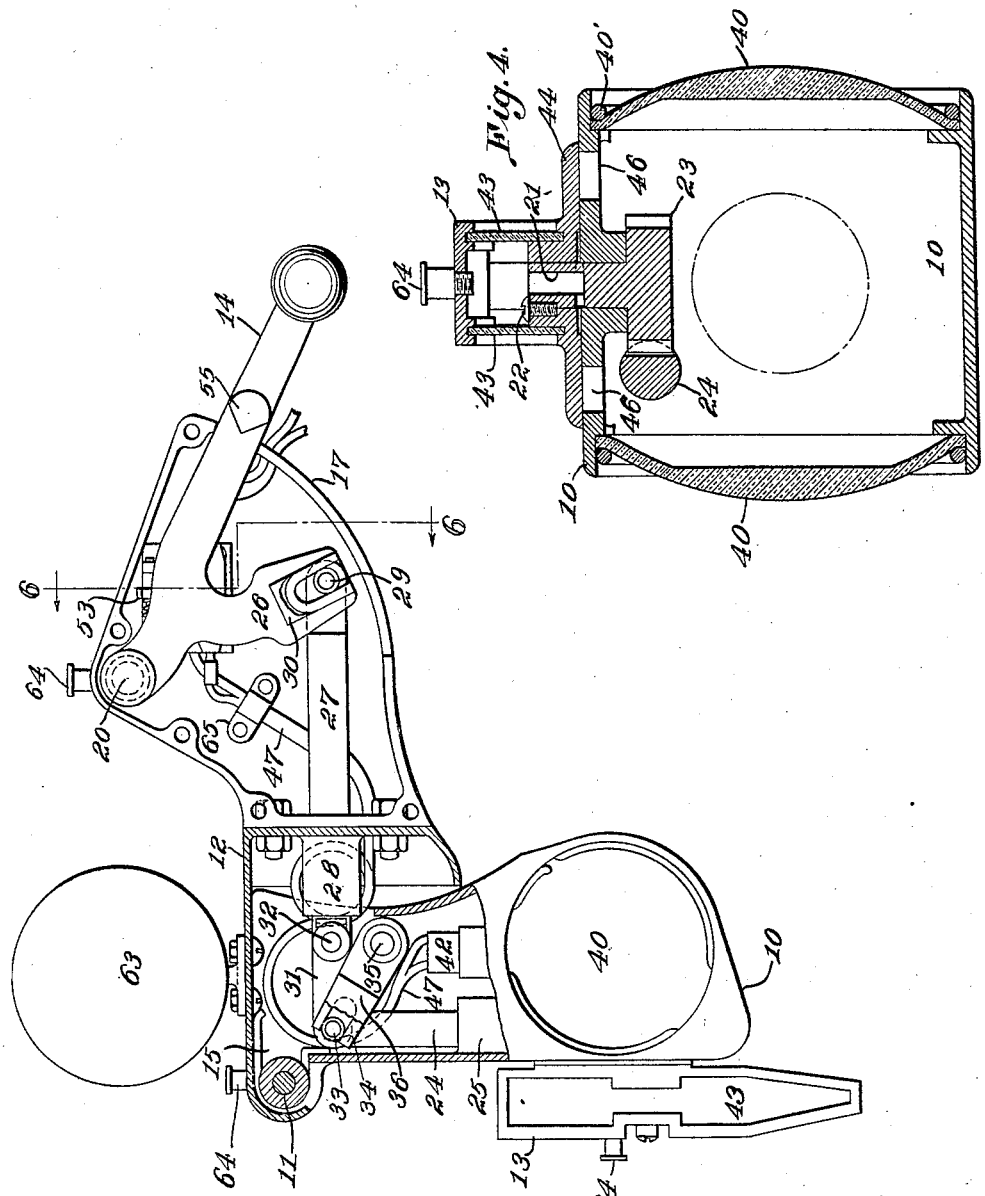

Nov. 6, 1923.

D. E. HALL 1,472,976

TRAFFIC SIGNALING DEVICE

Filed Aug. 11, 1922   4 Sheets-Sheet 4

Inventor
Daniel E. Hall.

By Mason Fenwick Lawrence,
Attorneys

Patented Nov. 6, 1923.

1,472,976

UNITED STATES PATENT OFFICE.

DANIEL E. HALL, OF BATH, MAINE.

TRAFFIC-SIGNALING DEVICE.

Application filed August 11, 1922. Serial No. 581,137.

*To all whom it may concern:*

Be it known that I, DANIEL E. HALL, a citizen of the United States, residing at Bath, in the county of Sagadahoc and State of Maine, have invented certain new and useful Improvements in Traffic-Signaling Devices; and I do hereby declare the following to be a full, clear, and exact description of the invention, such as will enable others skilled in the art to which it appertains to make and use the same.

This invention relates to improvements in traffic signaling devices particularly designed for use with automobiles. It is an object of the invention to provide a traffic signaling device which will enable the operator of the automobile to indicate his intention as to direction of travel. At the present time it is customary for the operator to project his hand over the side of the automobile to indicate that he is about to turn a corner or to stop. The invention aims to provide a semaphore signal which is operable from the interior of the automobile in a novel manner, the signal being provided with a turnable indicator. It is also an object of the invention to provide means for illuminating the signal and indicator to enable the device to be used for night driving as well as daylight use.

The above and other objects and novel features of the invention will appear from the detailed description thereof taken in connection with the accompanying drawings forming part of this specification, the scope of the invention being defined in the appended claims.

In the drawings,

Figure 1 is a partial horizontal section and plan view of the improved signaling device, the signal arm being shown as extended;

Fig. 2 is a vertical section of Fig. 1;

Fig. 3 is a partial vertical section and elevational view of the device, the signal arm being in retracted or depending position;

Fig. 4 is a vertical section on line 4—4 of Fig. 1;

Fig. 5 is a vertical section through line 5—5 of Fig. 1;

Fig. 6 is a vertical section on line 6—6 of Fig. 3;

Fig. 7 is a fragmentary transverse sectional view showing details of the operating lever;

Figure 8:
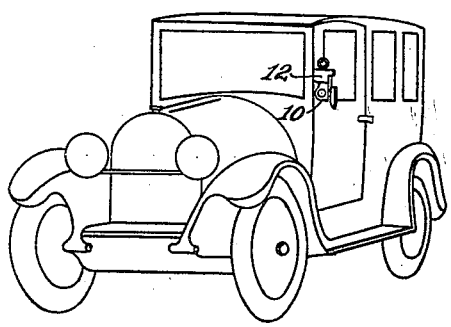
Fig. 8 is a perspective view showing the improved device applied to a closed car.
Figure 9:
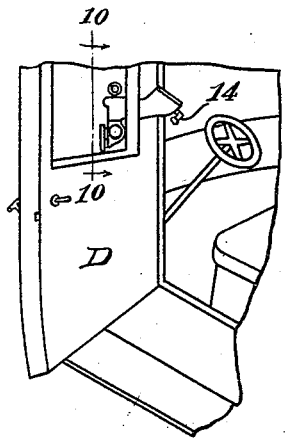
Fig. 9 is a fragmentary perspective view illustrating the preferred manner of attaching the device to a closed car.

In the drawings, 10 indicates the signal or semaphore arm which is swingably secured as at 11 to the main body 12 of the device. 13 is a pointer or direction indicator pivotally mounted on the signal arm 10, and 14 is the operating lever for swinging the signal arm to horizontal or extended position and for operating other mechanism hereinafter described.

15 is a coil spring wound around the pivot pintle 11, the ends of the spring re-acting against the signal arm 10 and the body or housing 12 of the device. The tendency of this spring is to maintain the signal arm 10 in extended or horizontal position, as shown in Figs. 1 and 2, the signal arm being maintained in dependent position as shown in Fig. 3 by means of the operating lever 14. The operating lever is provided with a spring-pressed frictional contact 16 (see Fig. 7) which bears against the arcuate surface 17 of the housing 12 for maintaining the operating lever in any given position. 18 indicates a spring which presses against said friction plug and 19 is the screw for adjusting the tension of the spring. The operating lever swings on a pivot 20 at the top of the housing 12.

When it is desired to swing the signal arm to signaling or horizontal position, the operating lever is moved in a clockwise position as viewed in Figs. 2 and 3, to allow the spring 15 to elevate or swing the signal arm. After the signal arm has been brought to extended or horizontal position further movement of the operating lever in the same direction will serve to rotate the pointer by mechanism now to be described. The pivot of the pointer 13 is a shaft 21 (see Figs. 4 and 5) to which the pointer is keyed as by a key 22, said shaft having a pinion 23 within the signal arm. Meshing with this pinion is a rack 24 which is confined to a straight-away movement by a bearing 25 extending from a wall of the arm 10, the bar passing through said bearing. The operating lever is provided with an arm or jaw 26 for imparting straight line movement to a bar 27, said bar being confined to such movement by a bearing 28 extending from a partition wall in the housing 12, the bar passing through said bearing as will be readily understood. The connection between the jaw 26 and bar 27 preferably takes the form of a pin 29 extending through the end of the bar 27, said pin being provided with rollers to permit easy movement between the jaw and bar. If desired, a plate 30 may be disposed on either side of the jaw to keep the rollers from coming off of the pin or other means may be provided for this purpose. Connection is made between the rack bar 24 and the bar 27 in a novel manner.

31 is a link which connects the adjacent ends of bars 24 and 27, 32 indicating a pivot pin between said link and bar 27 and 33 the pivot pin between said link and bar 24. 34 is an arm pivotally mounted as at 35 to the swinging arm 10. This arm comprises in effect a U-shaped member, the arms of which extend on either side of the link 31 and the terminals whereof are bifurcated or slotted to receive the ends of the pin 33 which connects the link 31 and rack bar 24. In the drawings, the legs of the U of the arm 34 are shown as provided with plates 36 for preventing displacement of the pin 33. If desired, the pin 33 may be provided with rollers to allow easy movement between the pin and arm 34. The pivot pin 35 for the arm 34 extends across the walls of the arm 10 and is surrounded by a coil spring 37, one end of the spring being anchored to the arm 10 as on a lug 38 and the other end of the spring re-acting against the arm 34. This spring tends to move the free end of the arm 34 toward the jaw 26, and hence to oppose displacement of the link 31. It will be recalled that when it is desired to bring the signal arm to operative or horizontal position that the operating lever 14 was moved toward the signal arm, the arm being swung to said position by the spring 15 surrounding the pivot 11 between the arm 10 and support or housing 12. The purpose of spring 37 is to prevent movement of the rack bar 24 while the signal arm is being swung to horizontal or extended position. After the signal arm has been swung to extended position by the spring 15, further movement of the operating lever will overcome the tension of the spring 37 and hence will cause movement of the rack bar 24 to operate the pointer 13. The connection between the operating lever 14 and the pointer 13 is such that the latter may be swung through an arc of substantially 150 degrees. Figure 1 shows the pointer in four different positions, the normal position or position before turning being shown in full lines.

Means are provided for illuminating the signal arm and pointer or arrow so that the device may be used for night driving as well as day driving. The signal arm, as will now be understood, is hollow. The free end of the arm is provided with transparencies 40, the front one of which is white and the rear one of which is red, there being a source of light such as an electric light bulb 41, 42 indicating a socket therefor which is set into a partition in the arm. The transparencies are held in place in any suitable manner as by split rings 40'. The pointer 13 is also provided with transparencies 43. In order to allow the pointer to be illuminated from the globe 41 at proper times, there is provided a shutter 44 in the nature of a flange-like collar affixed to the shaft 21, said flange having a pair of openings 45, one on either side of said shaft 21 on the longitudinal axis of the arrow, said openings being adapted to overlie a pair of openings 46 in the adjacent wall of the signal arm, there being series of said openings 46 which are adapted to cooperate with the openings 45 in the pointer when the latter is disposed in the positions indicated in dotted lines in Fig. 1. When the pointer is in the position shown in full lines in Fig. 1, the pointer is not illuminated, there being no openings in the signal wall to allow light to pass through when the arrow is in said full line position. The operating arm 14 controls the flow of electric current to the globe 41. 47 indicates electric wires running from the socket 42 and out through the housing at the operating lever end of the device. One branch of the wire is divided and the terminals thereof connected to binding posts 48. The gap between the binding posts is closed by a metal plate 49 at one end of a bell crank lever 50, said lever being mounted on a pivot 51 carried by a bracket 52 suitably secured to the housing 12 behind the operating lever. The other end 53 of the bell crank extends across the path of the operating lever 14 and is so disposed with respect thereto that when the operating lever is in the position shown in Fig. 3, it makes contact with the arm 53, thereby removing the contact plate 49 from the posts 48. A spring 54 re-acting against the bell crank and support 52 tends to swing the bell crank so as to bring the plate 49 into contact with the binding posts 48 to establish closed circuit to the lamp or globe 41.

In order to enable the position of the operating lever with respect to its quadrant 17 to be readily determined at night, a radiant spot 55 may be provided on the lever and similar spots 56 may be provided on the cover plate 57 in front of the lever 14.

Figure 11:
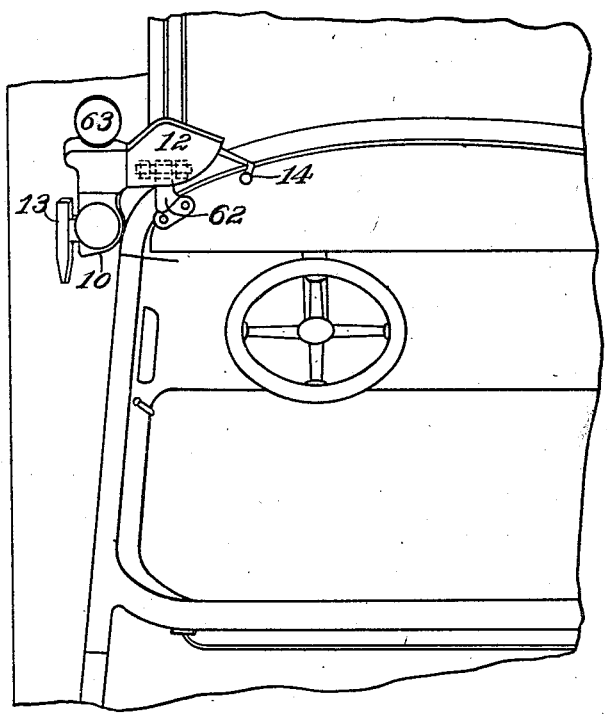
Fig. 11 is a fragmentary perspective view showing the invention applied to an open car.
Figure 10:
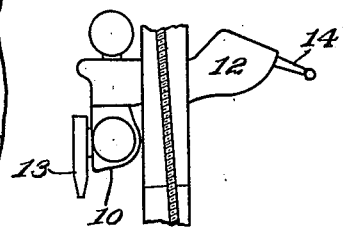
Fig. 10 is a vertical section on line 10—10 of Fig. 9.

In order to enable the device to be attached to the automobile, there is provided lateral lugs 60 which are preferably so constructed that a pin 61 can be secured between said lugs, said pin being adapted to support a bracket 62, whereby the signaling device may be supported on an open car as in Fig. 11.

The device is particularly adapted for use with closed cars and when so used, it is designed to be secured preferably to the door D, as shown in Fig. 8. The signal arm is preferably of white enamel so as to be conspicuous.

A mirror 63 may be mounted on the body 12. 64 indicates oil cups disposed so as to allow lubrication of the lever pivot 20, pin 11 and shaft 21, the latter being drilled axially and laterally to allow oil to pass to the shutter (see Fig. 4). The main support 12 is preferably made in two parts, which are secured together as by bolts 12'. 65 indicates a bracket for supporting the electric cable 47.

I have described spring 15 surrounding the pivot pintle 11 as functioning to elevate or swing the signal arm to horizontal position when the operating lever is moved to permit the spring to function. While I prefer to provide the said spring 15, the provision of said spring is not absolutely necessary to the successful operation of the device. As has already been pointed out, the spring 37 is of sufficient tension to prevent swinging of the arm 34 by the operating lever 14 until after the signal arm has been swung to horizontal position. If it is desired to omit spring 15, the spring 37 will be made of sufficient tension to resist swinging or turning movement of the arm 34 by the operating lever 14 until the signal arm 10 has been swung to horizontal position by force transmitted from the operating lever 14 to the crank arm 34 and the connections between said arm and operating lever. The signal arm 10 may be swung to horizontal position in the manner indicated by reason of the fact that pivot pin 33, which turns in the free end of the crank arm 34, is a considerable distance below the pintle 11, which connects the signal arm to the support 12. In other words, the pin 33 functions, during the time the signal arm is being swung to horizontal position, substantially the same as a fixed point on the signal arm 10 to which point force may be transmitted from the operating lever 14.

Various modifications and changes may be made in details without departing from the spirit of the invention, it being distinctly understood that no limitations are intended except as may be imposed by the appended claims.

What I claim is:

1. In combination, a support, a signal arm swingably carried by said support for movement in a vertical plane, a direction indicator carried by said arm, and means operable from said support for moving the said arm and indicator.

2. In combination, a support, a signal arm swingably carried by said support for movement in a vertical plane, a pointer turnably mounted on said arm, and means operable from said support for first swinging the arm and subsequently moving the pointer.

3. In combination, a support, a signal arm pivoted to said support and normally pendant therefrom, a pointer turnably mounted on said arm, means operable from said support for moving said arm to horizontal position, and means for turning said pointer.

4. In combination, a support, a signal arm pivoted to said support and normally pendant therefrom, a pointer turnably mounted on said arm, means operable from said support for moving said arm to horizontal position, means for turning said pointer, and means for illuminating the swinging end of said arm and said pointer.

5. In combination, a support, a signal arm pivoted to said support and normally pendant therefrom, a pointer pivoted to said arm on an axis extending transversely to the pivotal axis of the swinging arm, and means operable from said support for first swinging said arm about its pivot and subsequently turning said pointer about its pivot.

6. In combination, a support, a signal arm pivoted to said support and normally pendant therefrom, a pointer pivoted to said arm on an axis extending transversely to the pivotal axis of the swinging arm, an operating lever pivoted to said support, a flexible connection between said lever and said arm, and means leading from said connection for turning the pointer.

7. In combination, a support, a signal arm pivoted to said support and normally pendant therefrom, a pointer pivoted to said arm on an axis extending transversely to the pivotal axis of the swinging arm, an operating lever pivoted to said support, a stub arm pivoted on said swinging arm, a link connection between said lever and stub arm, tension means tending to oppose movement of said stub arm in one direction, and means turnably connecting said pointer to said stub arm.

8. The combination as in claim 7, and tension means tending to swing the signal arm about its pivot.

9. In combination, a support, a signal arm pivoted to said support and normally pendant therefrom, a pointer pivoted to said arm on an axis extending transversely to the pivotal axis of the swinging arm, an operating lever on said support, a rack and pinion for turning said pointer, a stub arm pivoted to said signal arm, means connecting said rack to said operating lever including a flexible connection supported by said stub arm, and tension means for swinging the signal arm about its pivot during a given movement of the operating lever.

10. In combination, a support, a signal arm swingable on said support, transparencies at the outer end of said arm, a source of light between said transparencies, a turnable pointer on said arm turnable on an axis extending transversely to the pivotal support of said arm, and means for illuminating said pointer from said source of light.

11. In combination, a support, a signal arm swingable on said support, transparencies at the outer end of said arm, a source of light between said transparencies, a turnable pointer on said arm turnable on an axis extending transversely to the pivotal support of said arm, transparencies on said pointer, and means for admitting light to said pointer from said source of light.

12. In combination, a support, a signal arm swingable on said support, transparencies at the outer end of said arm, a source of light between said transparencies, a turnable pointer on said arm turnable on an axis extending transversely to the pivotal support of said arm, transparencies on said pointer, means for admitting light to said pointer from said source of light, and means on said support for controlling said source of light.

13. In combination, a support, a signal arm swingable on said support, transparencies at the outer end of said arm, a source of light between said transparencies, a turnable pointer on said arm turnable on an axis extending transversely to the pivotal support of said arm, transparencies on said pointer, means for admitting light to said pointer from said source of light, an operating lever on said support, means between said arm and pointer operable by said lever for swinging said arm and turning said pointer, and means operable by said lever for controlling the source of light.

14. In combination, a support, a signal arm pivoted to said support and normally pendant therefrom, a pointer pivoted to said arm on an axis extending transversely to the pivotal axis of the swinging arm, means operable from said support for first swinging said arm about its pivot and subsequently turning said pointer about its pivot, and a source of light on said means for indicating the positions of said signal arm and pointer.

15. In combination, a support, a signal arm pivoted to said support and normally pendant therefrom, a pointer pivoted to said arm on an axis extending transversely to the pivotal axis of the swinging arm, an operating lever on said support for first swinging said arm about its pivot and subsequently turning said pointer about its pivot, and a spot light carried by said lever for indicating its position relatively to said support.

16. In combination, a support, a signal arm swingably mounted on said support, tension means tending to swing said arm to horizontal position, means controlling said arm comprising an operating lever pivoted to said support, a pointer pivotally mounted on said arm, a pinion affixed to said pointer, a rack meshing with the pinion, and a flexible connection between said rack and lever for moving said rack, a source of light at the swingable end of said arm at one side of said pinion, transparencies on said arm at either side of said source of light, transparencies in said pointer, a shutter between said pointer and source of light, and means operable by said lever for controlling said source of light.

17. The combination as in claim 15 and spaced spot lights past which the operating lever is adapted to be swung.

18. In a signaling device, a support, a signaling arm pivoted to the support and adapted to be swung to signaling position, means for operating the signaling arm comprising a lever mounted on said support, a spot light carried by the said lever and a plurality of spaced spot lights carried by said support in an arc corresponding to the arc of movement of the said lever, said spot lights serving to visualize the position of the signal arm in relation to the operating lever.

In testimony whereof I affix my signature.
DANIEL E. HALL.